United States
David

4,118,622
Oct. 3, 1978

[54] CONE OPTICAL SYSTEM
[75] Inventor: Karl-Heinz David, Den Haag, Netherlands
[73] Assignee: Organisation Européenne de Recherches Spatiales, Paris, France
[21] Appl. No.: 742,866
[22] Filed: Nov. 18, 1976
[30] Foreign Application Priority Data
  Nov. 11, 1975 [BE] Belgium .................... 162028
[51] Int. Cl.² .......................................... H01J 3/14
[52] U.S. Cl. ........................ 250/216; 250/203 R; 350/198; 350/202
[58] Field of Search .......... 250/203 R, 216; 350/189, 198, 199, 200, 202; 356/151
[56] References Cited
U.S. PATENT DOCUMENTS
  3,383,511  5/1968  Palser .................... 250/203
  3,838,277  9/1974  Morgenstern et al. ........ 250/216

*Primary Examiner*—Lawrence J. Dahl
*Attorney, Agent, or Firm*—Young & Thompson

[57] ABSTRACT

A cone optical system comprising:

(a) a convex conical mirror having a symmetry axis, (b) a refracting element having at least one conical surface, with a common symmetry axis with said convex conical mirror, said mirror and refracting element having apex angles selected such that a first paraxial light beam impinging said convex mirror in a direction substantially perpendicular to said symmetry axis is reflected toward said refracting element, traverses same and emerges therefrom as a second paraxial light beam, and (c) a collecting lens on the side of said refracting element opposite said mirror and adapted to focus said second light beam onto an image point located on said symmetry axis.

7 Claims, 6 Drawing Figures

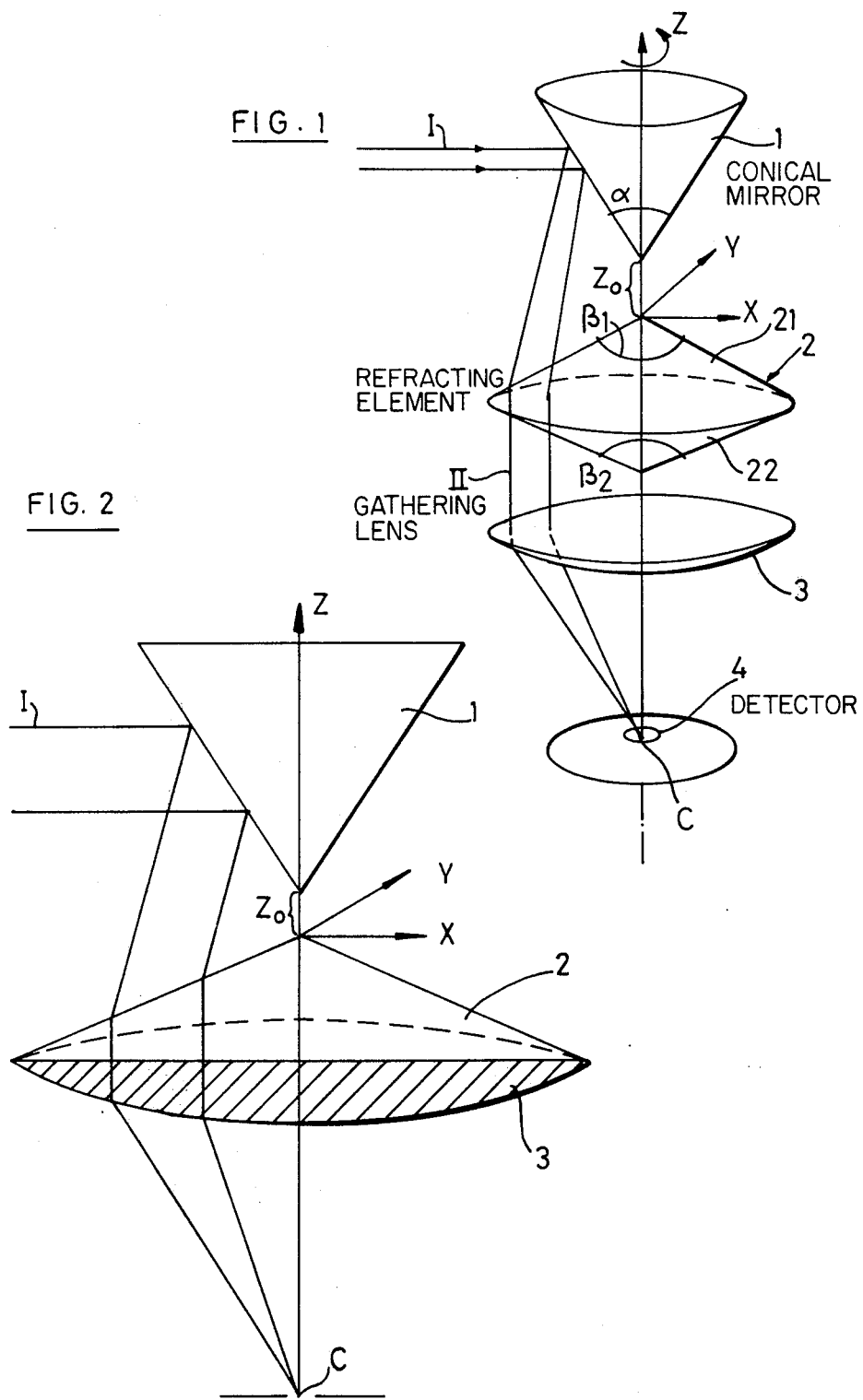

CONE OPTICAL SYSTEM

BACKGROUND OF THE INVENTION

The present invention relates to a cone optical system wherein there is provided correction for the astigmatism of paraxial rays.

An optical system of this type can be used with particular interest in optical sensors for controlling the attitude of spinning artificial satellites in space. An optical sensor is a device installed aboard a satellite for sensing the light radiated by a celestial target (sun, moon, earth or a star) to convert it into an electric signal to be used thereafter to determine the deviation of the satellite axis relative to a reference direction.

Attitude sensors in spin stabilized satellites for coverage reasons frequently are required to have an extended field of view of up to 120° or higher in one direction and field of view of about 1° or less perpendicular to it. If the lengthwise extension of view (LEOV) of 120° or higher is aligned approximately parallel to the spin axis, there is a high probability that the small crosswise extension of view (CEOV) crosses the reference target (sun, earth, star) and that the instant at which this occurs can be determined and used for attitude determination. Current designs of such sensors generally employ optical systems which collect the light coming from the target onto one or several slits behind each of which is a detector which transduces the optical signal passing through the slit into an electrical signal. This indicates the target crossing instant. An advanced embodiment for an optical sensor of this type is described in U.S. Pat. No. 3,838,277.

There are a number of disadvantages inherent to the known sensors, among others the following:

(1) the sensors should preferably have an elongated shape in order to collect the transmitted energy through the slit with the best efficiency as possible;

(2) the image brightness decreases towards the outer portions of the LEOV unless masks are implemented sacrificing the brightness in the central portion of the LEOV or unless use is made of complex optical systems which introduce distortion;

(3) the image definition in the CEOV direction frequently deteriorates towards the edges of the LEOV;

(4) the extension of the LEOV beyond 120° becomes increasingly hard and a limit is generally set by the image quality, the required detector length and the energy collection efficiency;

(5) sensors comprising several detectors are prone to alignment problems.

Another type of optical sensor comprises an optical system consisting of an inverted reflecting cone associated with a concentration lens as described in a paper entitled "Inside-Out Horizon Scanner" by J. Killpatrick, published in Applied Optics, Vol. 1, No. 2, March 1962.

This sensor, however, employs a reflecting cone, together with a collecting lens only without using a refracting cone. This results in high aberrations for paraxial rays. Moreover, the sensor is used in a radiation balance mode i.e. for non-spinning satellites, in such a way that its symmetry axis Z is pointing towards the target. In this mode, the sensor is suitable only for widely extended targets. For targets in a plane perpendicular to the optical axis, the optics as described by Killpatrick suffers from bad imaging properties.

The object of the invention is an optical system producing an image free of astigmatism for parallel rays and in which the imaging quality is independent from the azimuth of the radiation source.

When applied to an optical sensor for controlling the attitude of a spinning satellite, the invention has for object an optical sensor which permits substantially reducing the alignment problems and to utilizing detectors having circular shaped sensitive elements which are more easily available on the market.

SUMMARY OF THE INVENTION

According to the invention there is provided a cone optical system comprising:

(a) a convex conical mirror having a symmetry axis, (b) a refracting element having at least one conical surface with a common symmetry axis with said convex conical mirror, said mirror and refracting element having apex angles selected such that a first paraxial light beam impinging said convex mirror in a direction substantially perpendicular to said symmetry axis is reflected toward said refracting element, traverses same and emerges therefrom as a second paraxial light beam, and (c) a collecting lens placed behind said refracting element thereby to focus said second light beam onto an image point located on said symmetry axis.

When used jointly with an optical-electrical detector positioned at the image point with the sensitive element thereof in a plane perpendicular to the symmetry axis, the system of the invention can be used for instance as an optical sensor aboard a spinning artificial satellite for controlling the attitude thereof in space.

BRIEF DESCRIPTION OF THE DRAWING

In the drawings:

FIG. 1 schematically illustrates the basic structure of the system of the invention;

FIG. 2 illustrates a variation of the structure of FIG. 1;

DESCRIPTION OF THE PREFERRED EMBODIMENTS

Figure 3:
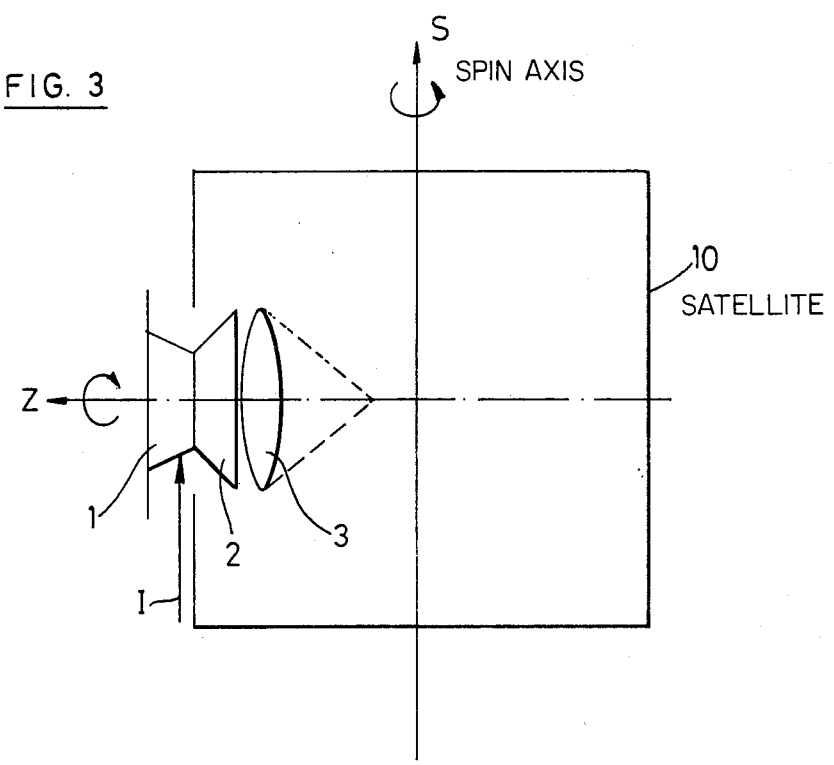
FIGS. 3 and 4 schematically illustrate a first typical arrangement of the system of the invention as seen in a plane parallel with and perpendicular to the longitudinal axis of an artificial satellite, respectively.

Referring now to FIG. 1 there is shown schematically the typical structure of the invention with its symmetry axis Z. The system comprises a convex conical mirror 1, a refracting element 2 and a collecting lens 3, all these elements having a rotational symmetry around common axis Z. In the embodiment shown, the refracting element 2 has two opposite conical surfaces 21 and 22. The apex angles $\alpha$, $\beta_1$ and $\beta_2$ of the cones are chosen such that a paraxial light beam I perpendicular to axis Z impinging the conical mirror 1 is reflected by same towards the refracting element 2, traverses the conical surfaces 21 and 22 thereof and emerges therefrom as a second paraxial light beam II towards the collecting lens 3. The latter focusses said second beam to a point C on the symmetry axis Z.

It has been found that by properly dimensioning the system, the position of the image point depends on and only on the angle between the direction of the incident rays and symmetry axis Z, but that it is independent from the azimuth of the radiating source. Thus, the system as described is capable of sensing rays from sources along a great circle of the celestial sphere perpendicular to axis Z, that is sources having an azimuth angle from 0° to 360°.

When used in an optical sensor for controlling the attitude of a spinning satellite, the system of FIG. 1 must be completed with a conventional photoelectric detector placed at the image point and having a circular sensitive element in an X-Y plane perpendicular to the symmetry axis Z. The diameter of said element defines the extension of the field of view in a plane perpendicular to X-Y plane. The image of a target, i.e. a radiation source suitable for reference point in space, crossing the X-Y plane at any azimuth angle moves in the focal plane along a trajectory passing the image point C when the target crosses the X-Y plane. An important advantage is that the azimuth angle of the target can theoretically be 360° for the same image quality.

In a variation of the embodiment of FIG. 1, the apex angle $\beta_2$ may be 180°, the conical surface 22 reducing then to a plane. Furthermore, the concentrating effect of lens 3 can be realized by suitably shaping the base of cone 21, as shown in FIG. 2. If needed, residual aberrations of bundle II can be compensated for by varying the distance Zo between the apices of cone elements 1 and 2.

To make the structure more compact without altering the image quality in any way the optical elements 1 and 2 may be formed with frusto-conical surfaces. FIG. 3, for instance, schematically depicts a compact structure made of two joining truncated cones 1 and 2.

An optical sensor using the optical system of the invention may be installed on board a spinning satellite in different ways to serve to control the attitude thereof. FIGS. 3 to 6 illustrate three typical implementations.

Figure 4:
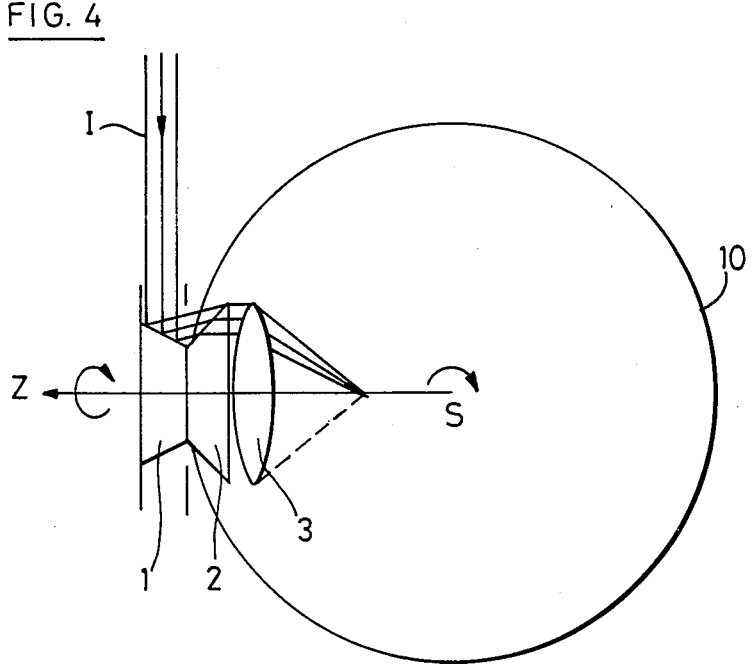

FIGS. 3 and 4 illustrate a typical arrangement in which the optical structure has its symmetry axis Z perpendicular to the spin axis S of a satellite represented by block 10. In this arrangement the system permits producing, for every revolution of the satellite, two signals representing the target crossing the plane X-Y.

Figure 5:
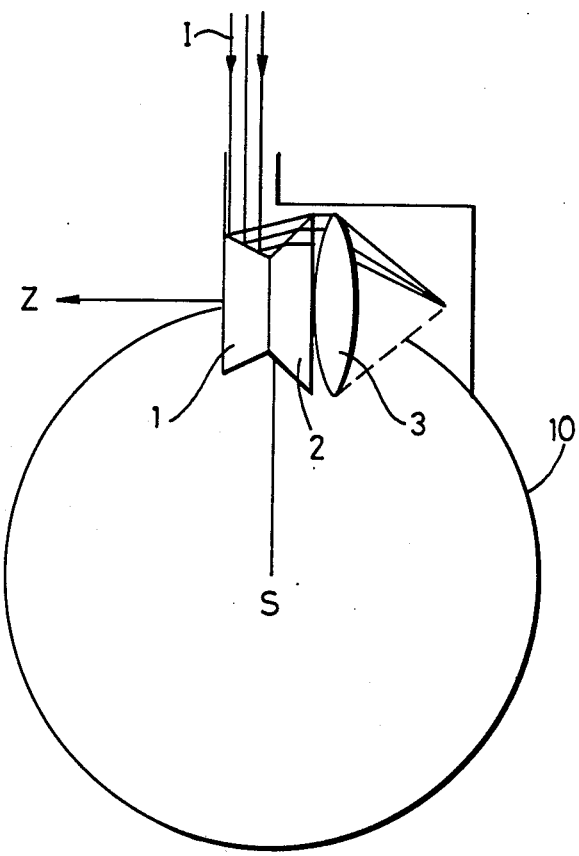
FIGS. 5 and 6 schematically illustrate two further arrangements of the system of the invention aboard an artificial satellite.

Another arrangement is illustrated in FIG. 5. In this arrangement the symmetry axis Z is perpendicular to the satellite's spin axis S as in the foregoing example but here it is tangent to the circumference that limits the cross-section of the satellite 10. In this case the satellite aspect angle is limited to a range from −90° to +90°.

Figure 6:
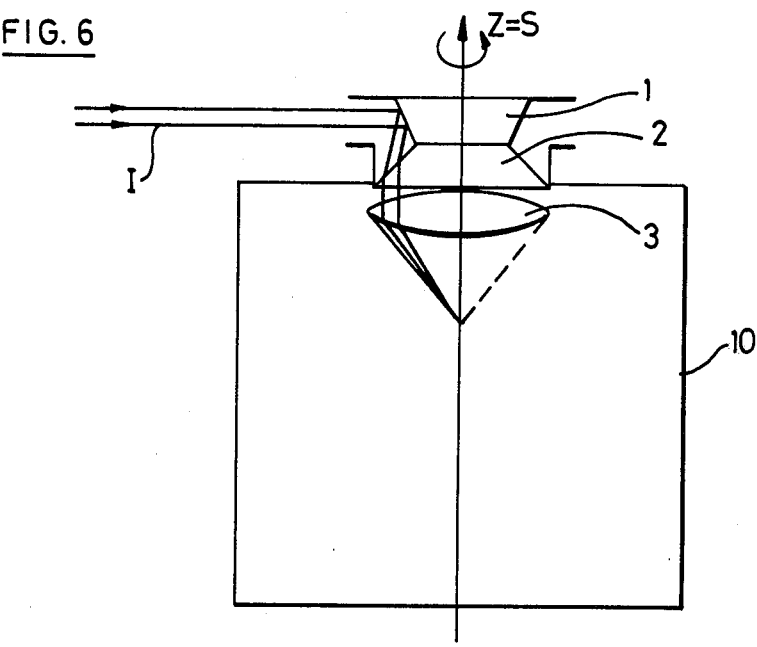

In the arrangement illustrated in FIG. 6, the symmetry axis Z is parallel with the satellite's spin axis S. In this case the system permits the deviation of axis S relative to the perpendicular to the line target-satellite to be measured.

It will be understood that the optical system of the invention is represented in FIGS. 3 to 6 in an exemplary compact form which appears to be advantageous from a practical point of view.

What is claimed is:

1. A cone optical system, comprising:
   (a) a convex conical mirror (1) having a symmetry axis (Z),
   (b) a refracting element (2) having at least one conical surface with a common symmetry axis with said convex conical mirror, said mirror and refracting element having apex angles ($\alpha$, $\beta_1$, $\beta_2$) selected such that a first paraxial light beam (I) impinging said convex mirror (1) along a direction substantially perpendicular to said symmetry axis is reflected toward said refracting element (2), traverses same and emerges therefrom as a second paraxial light beam (II), and
   (c) a collecting lens (3) on the side of said refracting element opposite said mirror and adapted to focus said second light beam onto an image point (C) located on said symmetry axis.

2. A cone optical system as claimed in claim 1, wherein the apex angle ($\beta_2$) of one of the conical surfaces of said refracting element is equal to 180°.

3. A cone optical system as claimed in claim 1, wherein said convex mirror (1) and refracting element (2) have frusto-conical surfaces.

4. A cone optical system as claimed in claim 1, wherein said refracting element has its base so shaped as to form said collecting lens.

5. In an artificial spinning satellite having a spin axis, an apparatus comprising a cone optical system having its symmetry axis perpendicular to said spin axis, said optical system including
   (a) a convex conical mirror (1) having a symmetry axis (Z),
   (b) a refracting element (2) having at least one conical surface, with a common symmetry axis with said convex conical mirror, said mirror and refracting element having apex angles ($\alpha$, $\beta_1$, $\beta_2$) selected such that a first paraxial light beam (I) impinging said convex mirror (I) along a direction substantially perpendicular to said symmetry axis is reflected toward said refracting element (2), traverses same and emerges therefrom as a second paraxial light beam (II), and
   (c) a collecting lens (3) on the side of said refracting element opposite said mirror and adapted to focus said second light beam onto an image point (C) located on said symmetry axis.

6. In an artificial spinning satellite having a spin axis, an apparatus comprising a cone optical system having its symmetry axis parallel with said spin axis, said system including
   (a) a convex conical mirror (1) having a symmetry axis (Z),
   (b) a refracting element (2) having at least one conical surface with a common symmetry axis with said convex conical mirror, said mirror and refracting element having apex angles ($\alpha$, $\beta_1$, $\beta_2$) selected such that a first paraxial light beam (I) impinging said convex mirror (1) along a direction substantially perpendicular to said symmetry axis is reflected toward said refracting element (2) traverses same and emerges therefrom as a second paraxial light beam (II), and
   (c) a collecting lens (3) on the side of said refracting element opposite said mirror and adapted to focus said second light beam onto an image point (C) located on said symmetry axis.

7. A cone optical system as claimed in claim 1, and photoelectric detecting means (4) located at said image point and having a sensitive element that is located in a plane (X-Y) perpendicular to said symmetry axis.

* * * * *